May 8, 1928.
F. GARDNER
1,668,766
OIL FIELD EMULSION TREATING MEANS
Filed April 24, 1925
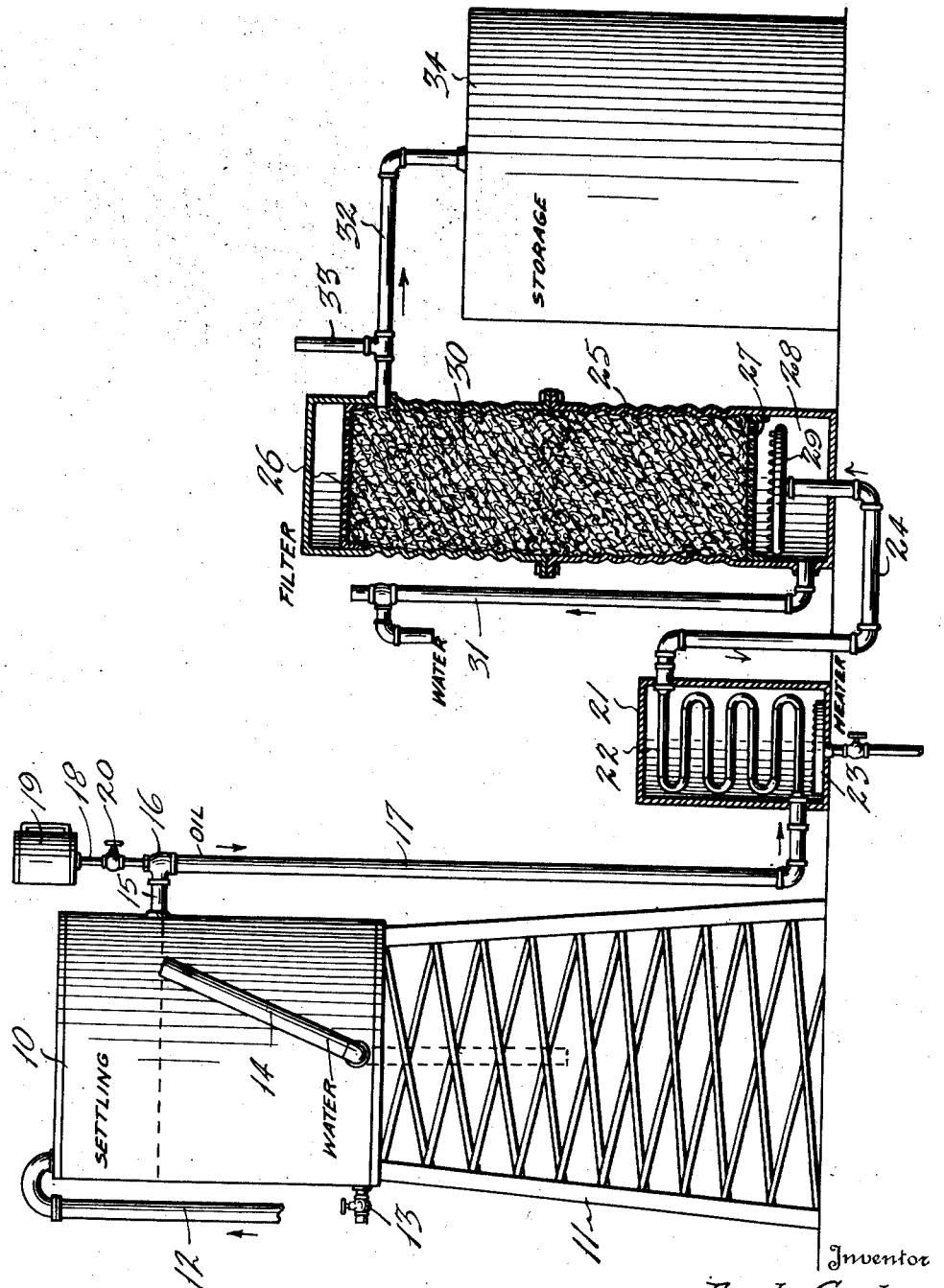
Inventor
Frank Gardner.
By Jack Ashley
Attorney Patented May 8, 1928.

1,668,766

UNITED STATES PATENT OFFICE.

FRANK GARDNER, OF DALLAS, TEXAS.

OIL-FIELD-EMULSION TREATING MEANS.

Application filed April 24, 1925. Serial No. 25,471.

This invention relates to new and useful improvements in oil field emulsion treating means.

The object of the invention is to separate water from oil in a simple, expeditious and economical manner.

A particular object of the invention is to treat oil carrying emulsions, whereby the water is precipitated and the oil is drawn off.

A particular object of the invention is to heat the effluent prior to separation, whereby the viscosity is reduced.

A further object of the invention is to retard the flow of the effluent after heating, whereby demulsification of the oil and water is assisted and the separation is accentuated.

A construction designed to carry out the invention will be hereinafter described together with other features of the invention.

The invention will be more readily understood from a reading of the following specification and by reference to the accompanying drawings, and wherein:

The figure in the drawing illustrates an apparatus for carrying out the invention.

In said drawing the numeral 10 designates an elevated receiving tank supported on a pedestal 11. A pipe 12 enters the top of the tank for conveying crude oil from the field to the tank. A bleeder valve 13 is provided near the bottom of the tank for drawing off the water which collects therein. A drain pipe 14 is swiveled to the lower portion of the tank and by swinging the same down, the tank may be drained or its level lowered.

A skimming pipe 15 leads from the tank for carrying off the crude oil as it collects in the tank. The pipe 15 is connected to an elbow 16 which in turn is connected to a down pipe 17. An upright pipe 18 having a cut-off 20 leads from the elbow and supports a receptacle 19 adapted to contain a suitable chemical or emulsion treating compound acting to make the oil and water more separable. The pipe 17 leads to a heater 21 where it is connected to the bottom of a coil 22. A suitable oil burner 23 in the bottom of the heater, heats the coil.

A conducting pipe 24 leads from the top of the coil to the bottom of an upright separator or filter 25 which in the oil fields is known as a "gun barrel". The gun barrel is formed of corrugated sections bolted together and with an upper baffle plate 26 and a lower baffle plate 27. These plates are perforated or foraminous and are spaced from the upper and lower ends of the gun barrel. A chamber 28 is formed in the barrel below the plate 27. The pipe 24 enters the said chamber and has a spray head 29 thereon.

Between the baffle plates a filter is formed by fibrous material 30 having sufficient density to retard the upward flow of the effluent sprayed from the head. A pipe 31 leads from the chamber 28 for the purpose of drawing off the water which is separated from the oil. A discharge pipe 32 leads from the upper portion of the barrel, below the plate 26, to a storage tank 34. The pipe 32 is provided with a vent 33 to prevent siphoning.

The oil from the wells is pumped through the pipe 12 into the receiving tank 10. The heavier matter in the oil settles to the bottom of the tank, and the pipe 17 leading from the tank at an elevated point, thus skims off the more fluent liquid. The effluent which settles in the tank includes a certain amount of free water, which is thus separated and may be later drawn off through the valve 13.

Some grades of oil require the assistance of a chemical to soften the water and more readily undergo separation or dehydration; while other grades of oil do not require such a chemical. Where a chemical of this nature is required, the same is stored in the tank 19 and introduced into the pipe 17 by opening the valve 20.

The effluent flows through the pipe 17 to the coil 22 of the heater. The heating of the effluent not only reduces its viscosity, but makes dehydration more rapid. The effluent or emulsion is sprayed from the head 29 after passing from the coil through the pipe 24. The action in the gun barrel 25 is such as to retard the flow of the effluent. Where the emulsion is combined with a treating chemical, the filter 30 will retard the flow to assist demulsification of the oil and water as well as cutting the free water from the oil. The effect is that the minute globules of water are collected to overcome the viscosity of the oil thus precipitating to the chamber 28. Where a chemical is not used the water will precipitate into the chamber 28 owing to the retardation of the filter 30. The effluent rising in the barrel 25 overflows through the pipe 32 to the tank 34, as pipe line oil.

What I claim, is:

Means for treating crude oil comprising a settling tank adapted to effect a primary separation of the oil from the water, a water discharge from said tank, a filter comprising a bottom water collecting chamber and a filter section above said chamber, a spray head in the water chamber, a conductor leading from the upper portion of the settling tank to the spray head feed by gravity thereto, a discharge pipe leading from the upper part of the filter section, a water draw-off leading from the chamber, and means for introducing a chemical into the conductor by a gravity feed at the discharge from the settling tank.

In testimony whereof I affix my signature.

FRANK GARDNER.